US011392805B2

(12) United States Patent
Sinclair et al.

(10) Patent No.: US 11,392,805 B2
(45) Date of Patent: Jul. 19, 2022

(54) COMPACT MULTI-SENSOR FUSION SYSTEM WITH SHARED APERTURE

(71) Applicant: The Charles Stark Draper Laboratory, Inc., Cambridge, MA (US)

(72) Inventors: Matthew A. Sinclair, Stoneham, MA (US); Adam Kelsey, Cambridge, MA (US); Paul Aaron Bohn, Huntsville, AL (US); Stephanie L. Golmon, Arlington, MA (US); Francis J. Rogomentich, Wilmington, MA (US); Juha-Pekka Laine, Boston, MA (US); Buddy A. Clemmer, Burlington, MA (US); David A. Landis, Palm Harbor, FL (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 506 days.

(21) Appl. No.: 16/454,998

(22) Filed: Jun. 27, 2019

(65) Prior Publication Data

US 2020/0005097 A1 Jan. 2, 2020

Related U.S. Application Data

(60) Provisional application No. 62/690,639, filed on Jun. 27, 2018.

(51) Int. Cl.
*G06K 9/62* (2022.01)
*G01S 17/88* (2006.01)
*G01S 13/86* (2006.01)

(52) U.S. Cl.
CPC .......... *G06K 9/6289* (2013.01); *G01S 13/867* (2013.01); *G01S 17/88* (2013.01)

(58) Field of Classification Search
CPC ...... G06K 9/6289; G01S 13/867; G01S 17/88
See application file for complete search history.

(56) References Cited

U.S. PATENT DOCUMENTS

| | | | | |
|---|---|---|---|---|
| 3,723,005 A | * | 3/1973 | Smith | G02B 23/00 356/29 |
| 4,282,527 A | | 8/1981 | Winderman et al. | |
| 4,626,063 A | * | 12/1986 | Honey | G02B 27/644 250/235 |
| 5,262,630 A | * | 11/1993 | Kordulla | F41G 7/2213 244/3.16 |
| 5,729,376 A | | 3/1998 | Hall et al. | |
| 6,072,572 A | | 6/2000 | Hatfield et al. | |

(Continued)

FOREIGN PATENT DOCUMENTS

EP 0601870 3/1997

*Primary Examiner* — Que Tan Le
*Assistant Examiner* — Don J Williams
(74) *Attorney, Agent, or Firm* — HoustonHogle LLP

(57) ABSTRACT

A potentially small, gimballed, multi-sensor system employs a shared aperture for at least some of the image sensors. Applications include intelligence, surveillance, target acquisition and reconnaissance (ISTAR), and guiding autonomous vehicles. The system can actively blend images from multiple spectral bands for clarity and interpretability, provide remote identification of objects and material, provide anomaly detection, control lasers and opto-mechanics for image quality, and use shared aperture using folded optics.

21 Claims, 5 Drawing Sheets

(56) References Cited

U.S. PATENT DOCUMENTS

| | | | |
|---|---|---|---|
| 7,248,401 B2 | 7/2007 | Bryant | |
| 7,545,562 B2 | 6/2009 | Chen et al. | |
| 2005/0249502 A1* | 11/2005 | Chen | G01S 7/4812 |
| | | | 398/118 |
| 2009/0303456 A1* | 12/2009 | Paiva | G01S 17/87 |
| | | | 356/3 |

* cited by examiner

COMPACT MULTI-SENSOR FUSION SYSTEM WITH SHARED APERTURE

RELATED APPLICATIONS

This application claims the benefit under 35 USC 119(e) of U.S. Provisional Application No. 62/690,639, filed on Jun. 27, 2018, which is incorporated herein by reference in its entirety.

BACKGROUND OF THE INVENTION

For autonomous machines, image data from multiple spectral bands must be processed simultaneously and in real-time for maximum situational awareness of surroundings. Unmanned aerial vehicles (UAVs) and self-driving automobiles, for example, must operate in a wide range of weather conditions, and both day and night, for missions including intelligence, surveillance, target acquisition and reconnaissance (ISTAR) and delivery and other governmental and commercial uses. For example, during the day, light in the visible spectral band is very useful. At night, however, visible will require active illumination. Thus, the ability to view the scene in the infrared might be preferred. Utilizing multiple spectral bands such as visible and infrared simultaneously has advantages for discriminating targets, seeing through camouflage and identifying chemicals.

Different image sensors are typically required for different spectral bands. For UAVs, it is often desirable to view the scene in one or more of the ultraviolet (UV) where the wavelength is less than 380 nanometers, visible (VIS) extending from about 380 to 740 nanometers, short-wavelength infrared (SWIR) extending from about 1.4 to 3 micrometers ($\mu m$), mid wave infrared (MWIR) extending from about 3-8 $\mu m$, and long wave infrared (LWIR) extending from about 8 to 15 $\mu m$. Image sensors based on different technologies and material systems are typically required for each of these spectral bands.

A convenient way to represent the entire image data collected from the scene is a hyperspectral cube. This is created by registering the images from the different image sensors, in the different spectral bands, with each other. The image cube can be thought of as representing wavelength-dependent radiances (in Watts·steradian$^{-1}$·m$^{-2}$·$\mu m^{-1}$) for each image sensor on a common array of pixels. In short, two dimensions of the cube represent the image coordinates, and the third dimension is wavelength. In addition to spatial registration, often it is also necessary to have temporal match of the image data. This means that the data must be taken at the same time and for the same time interval, especially if the scene is highly dynamic (i.e., rapidly changing with time).

Adding active ranging and imaging systems is also sometimes important for autonomous machines. Commonly the inclusion of RADAR or LIDAR is useful for the machines to understand the distance to various objects in the scene.

SUMMARY OF THE INVENTION

Typically, image registration process is mathematically and computationally intensive as it must reconcile platform motion, altitude, angle and field of view (FOV), pixel size (instantaneous field of view or IFOV, which is the field of view of one individual pixel on a detector), and possibly, account for atmospheric degradation of data, from one image sensor/spectral band to another.

The present system can be used to simplify image registration and facilitate other data fusion by having multiple sensors packaged as a single unit, possibly mounted on a common gimbal, with a shared boresight and aperture. Moreover, the present system can utilize simultaneous or near-simultaneous measurement of data from a variety of active and passive sensors, such as image sensors, acoustic sensor, radio frequency sensors, range finders, accelerometers, etc.

In the present system, processing the information from the sensors on a mobile platform is preferably performed close to the point of generation. In the past, a major challenge of fusing multi-sensor data is that processing of such data is typically performed at remote computers, due to the computationally intensive nature of the processing. Thus, large quantities of data must be transmitted to the computers for fusion. In fact, in some cases, the present system will perform data registration and fusion and even image analytics close to the sensor package and possibly on the gimbal that carries the package.

Furthermore, many current systems use multi-spectral imaging systems that are large and have separate apertures with band-specific optics. They might use conventional telephoto systems with refractive optics, and single-fold mirror based telescopes which tend to be large.

In contrast, in the present system, a single mirror system preferably collects the light for an image sensor system of the sensor package. A beamsplitter system might divide the collected light into separate spectral bands including the ultraviolet (UV), visible (VIS), and/or infrared (IR) bands, possibly including the short wave IR, medium wave IR (MWIR), and/or long wave IR (LWIR) bands. The use of the single mirror system helps to athermalize and make the system robust against vibration. Any mechanical distortion of the mirror system or in the mechanical coupling between the mirror system and the sensor package does not complicate image fusion since the effect of the vibration and distortion is the same for all of the image sensors.

The present system can be applied to possibly small, gimballed, multi-sensor systems with a shared aperture for two or more of the image sensors. Implementations of the invention achieve low SWaP (Small Weight And Power) by using mirror based folded optics for multi-spectral image sensors. Applications include intelligence, surveillance, target acquisition and reconnaissance (ISTAR). In addition, it can be used for guiding autonomous vehicles such as unmanned aerial vehicles (UAVs) and automobiles. In terms of guidance and navigation, it could be further used as a multi-band star tracker for a UAV or satellite or other space vehicle.

The invention features a system in which data from multiple passive and active sensors, such as optical (UV to LWIR), radio frequency, radar, acoustic, laser range finder, and accelerometers, are collected simultaneously, and processed by using a single gimbal-mounted system.

In general, according to one aspect, the invention features a multi-sensor system, comprising a mirror system collecting light received through a shared aperture and a sensor package including an image sensor system receiving the light from the mirror system and dividing the collected light between different image sensors of the sensor package.

In many cases, the system might further comprise a gimbal for carrying the mirror system and the sensor package. This mirror system and the sensor package could be fit within a sphere of less than 30 centimeters in diameter.

In some embodiments, the sensor package further emits radiation out through the shared aperture. For example, the sensor package could include a RADAR system and/or a LIDAR system interrogating a scene through the shared aperture. In fact, an antenna could be mounted to a front obscuration of the mirror system.

Preferably, the system includes an image processing system that processes information from the sensor package to create fused data, which could also be mounted on the gimbal. This image processing system might generate fused images, perform feature extraction, and/or perform object tracking. It could further include a multiplexer for transmitting fused data, generated by the image processing system, off of the gimbal.

A clock is additionally useful for enabling synchronization of information received from the sensor package.

In a current implementation, the image sensor system comprises a long wave infrared spatially resolved image sensor, a mid wave infrared spatially resolved image sensor, a visible spatially resolved image sensor, and/or a short wave infrared spatially resolved sensor.

Moreover, the mirror system preferably comprises at least a primary and a secondary mirror for relaying light received through the common aperture to the sensor package. In addition, a phase array antenna system could be mounted on a front obscuration of the mirror system. Additionally, for further compactness, the mirror system further comprises a tertiary mirror and a quaternary mirror, in some examples.

In general, according to one aspect, the invention features a multi-sensor system, comprising a mirror system collecting light received through a shared aperture, an image sensor system receiving the light from the mirror system and dividing the collected light between different image sensors of the sensor package, an image processing system that processes information from the image sensors to create fused data, and a gimbal carrying the mirror system image sensor system and the image processing system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Table 1 is a partial list of important sensors that are part of the sensor system of a UAV or self-driving autonomous vehicle system.

TABLE 1

| Typical sensors and their uses. | |
| --- | --- |
| RF sensors | Communication between vehicles and imaging |
| Acoustic | Distance, ambient sound |
| LIDAR (range finder) | Distance and imaging |
| Accelerometer/altitude sensor | Velocity (speed and direction) |
| Optical (VIS) | Fog, smoke, pedestrians; vehicles, barriers |
| IR | Night vision; seeing through fog day/night |
| UV | Gun fire |
| Telecom | Send/receive signals from satellite and computers |

Figure 1:
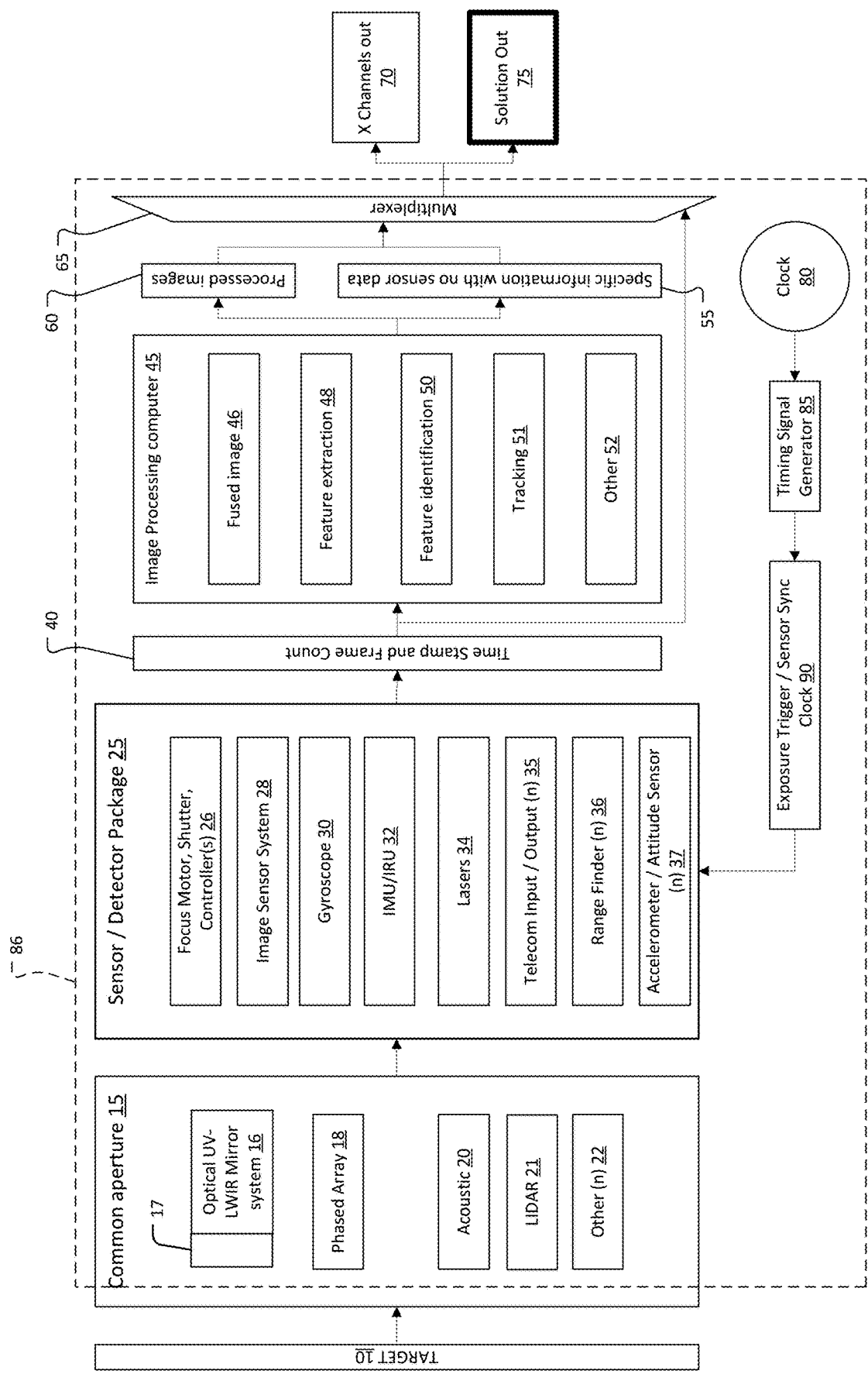
FIG. 1 is a block diagram showing the individual sensors and other components of the sensor fusion system along with acquired data and processed information pipeline.

FIG. 1 shows the individual sensor components of a sensor fusion system, which has been constructed according to the principles of the present invention.

In general, information is collected from a target 10 by several sensors, preferably both active and passive, through a common aperture 15.

The aperture 15 preferably permits bi-directional propagation, emission and collection, of several types of signals including optical/light by a mirror system 16, bi directional radio frequency (RF) radiation such as RADAR signals by a phased array send and receive antennas 18, acoustic signals by an acoustic transceiver 20 and other signals 22.

In the preferred embodiment the aperture 15 also allows bidirectional signal propagation enabling LIDAR 21, for example. LIDAR is a method that measures distance to a target by illuminating the target with pulsed laser light and measuring the reflected pulses with an optical sensor. Some additional sensors listed in Table 1 may also share the common aperture 15.

A sensor package 25 generally contains sensors for detecting the signals received through the aperture 15. Specifically, the package 25 preferably includes an image sensor system 28. In one example, these image sensors include an LWIR spatially resolved image sensor, an MWIR spatially resolved image sensor, a SWIR spatially resolved sensor, and a VIS spatially resolved image sensor.

In the typical application, the aperture 15 is part of a gimbal system 86 that points the boresight of the aperture 15. The gimbal 86 carries the mirror system 16, the phased array transceiver 18, LIDAR 21, and acoustic transceiver 20, inter alia. The gimbal also carries the sensor package 25.

This gimbal allows the common aperture 15 to be pointed in a desired direction under control of a computer 45, preferably also carried by the gimbal 86. This simplifies image registration and data fusion issues since the sensors of the sensor package 25 have a shared boresight and aperture 15.

In one embodiment, the gimbal 86 points the aperture 15 in both azimuth and elevation over a range of angles of at least 30 degrees in both azimuth and elevation.

The sensor package 25 may also include one or more lasers 34. These lasers generate light in the LWIR, MWIR, visible and/or UV and possibly radiation in the radio frequencies to millimeter wave frequencies to the terahertz frequencies in order to interrogate the target or the scene 10. The returning light is then typically detected by one of the image sensors 28, 29, and other sensors 33.

A telecom I/O port 35 receives control information from the host computer 45. The I/O port 35 further transmits the image data from the image sensors and other data generated by the sensors to the host computer 45. In one example, the image data and other data are transferred using an electronic or optical fiber umbilical. In other examples, it is transferred wirelessly such as by RF or free space optical data links.

The sensor package 25 may also include a range finder 36. In one embodiment, the range finder is a RADAR transceiver unit that generates a scanned RF signal that is transmitted via the phased array send and receive antennas 18 and then processes the RF return signal received through the aperture 15 and detected by the phased array send and receive antennas 18.

The sensor package 25 also includes and accelerometer/altitude sensor 37 for position and velocity, etc.

Focus motors and shutter controller(s) 26 set focusing and shutter parameters of the sensors/detectors contained in the package 25.

To further control the boresight of the mirror system 16, an auxiliary pointing system 17 is mounted in front of the mirror system 16 in some embodiments. This auxiliary pointing system 17 in some cases is an articulated fold mirror or prism, mounted in front of the mirror system 16. A Risley prism is another option. This fold mirror, prism, or prism system 17 is actuated by the focus motors and controller 26 in order to provide fine control and vibration/shock isolation in the pointing of the mirror system's boresight, whereas the gimbal 86 provides coarse control.

Preferably, in some embodiments, a gyroscope 30 is added to the sensor package. This is used to improve the stability of the system.

In addition, an inertial reference unit (IMU) and/or an inertial reference unit (IRU) 32 is included in some cases.

The sensor data processing computer 45 receives data from the sensor/detector package 25, and time stamp and frame count from interface 40. The role of the image processing computer 45 is to create a fused image 46, perform feature extraction 48, feature identification 50, tracking 51 and miscellaneous other tasks 52. In practice, the computer 45 includes one or more central processing units, memory and other peripherals, along with one or more graphic processing units (GPUs). In the preferred embodiment, the sensor data processing module 45 is also located on the gimbal.

Fused image 46 represents the hyperspectral cube datastructures that are generated by the image processing computer 45. They are typically the combination of optical data from the image sensor system 25. Having a common boresight for multiple image sensors makes it easier for sensors to image identical areas and correlate IFOV across multiple imagers which may have different pixel sizes, which makes fused images already registered at the point data acquisition, thus saving valuable time and computer resources by reducing the associated algorithmic load.

To cite some examples, extracted features provided by the feature extraction process or module 48 that executes on the image processing computer 45 could be a region in the image that potentially contains static barriers, such as trees and/or traffic control signs such as road signs and lights or an intended target. Feature identification module 50 that executes on the image processing computer 45 generates more precise identification of extracted features, such as differentiation of bicycles from cars, or cars from trucks, individuals. It may also include identifying pedestrians during day or night. Bicycles can be distinguished from cars, for example, by examination of radar cross-section data from the range finders 36. Tracking module 51 that executes on the image processing computer 45 resolves distance between cars, for example, using LIDAR and RADAR data. Other activities 52 could include velocity determination and weather condition using telecom 35 and accelerometers 37.

Timing and frequency of sensor data acquisition by sensor package 25 and use by the sensor data processing computer 45 are two critical parameters for real-time decision making using sensor data. In the system, sensors in the package 25 are fed timing information through exposure trigger/sensor clock 90, which in turn relies on a timing signal generator 85, which relies on clock 80. A single clock 80 drives and coordinates all sensors in the sensor package 25.

The role of exposure trigger/sensor sync clock 90 is to ensure that all relevant data are acquired at exactly the time required for operation. For example, if a self-driving car needs to apply brakes upon identification of a pedestrian on the road on a dark and rainy night, the driving controller must know the speed of the vehicle and distance from the pedestrian at the moment the pedestrian is identified. Similar challenges are confronted by UAVs.

In some embodiments, the clock 80, timing signal generator 85, and trigger/sensor sync clock 90 are included with the sensor package 25.

The output of the processing computer 45 is also passed to module 55, which produces specific information such as metadata, possibly with no specific sensor information. The processing module 45 also passes its output to module 60 for creating processed images.

In the example where the sensor fusion system is used on an autonomous vehicle, such as a self-driving automobile or unmanned aerial vehicle (UAV), often times communication to the vehicle's main control system will have limited speed or throughput even though updates on position need to happen rapidly. This positioning information may come from landmark recognition, celestial sightings, and/or relative position to another object. Unit 55, producing information other than raw sensor data, can produce and transmit information on a variety of dramatically different scenarios and further transmit decisions or solutions derived from the raw data. Some examples of such scenarios are: does a person have a gun if the car in front is driving erratically compared to the lines on the road, what the weather is like and how the vehicle should respond. In case of UAVs, the decision could be when to water plants.

In more detail, specific information with non sensor data 55 could be information about position of the pedestrian, but it is not necessary to know how the position was determined, i.e., using information from which sensor. Processed image 60 could be an image of a car which is identified as such, or an image of a pedestrian ahead which is identified as such.

Using clock 80, time signal generator 85 and exposure trigger/sensor sync clock 90, sensor package 25 acquires data through aperture 15 at regular intervals, and time stamps that information.

The processed images from 60 and specific information with non sensor data 55 are passed to multiplexer 65, which also obtains time stamp and frame count from 40. The output of multiplexer 65 is X channels out 70 and solutions out 75.

In more detail, the multiplexer 65 allows the system to send raw images, processed images, and/or the processed solutions off of the gimbal 86 for further processing and actions. This also allows for testing the health of the system, troubleshooting, and calibration, which require significantly more data transfer than normally desired in an economical fused sensor system.

Figure 2:
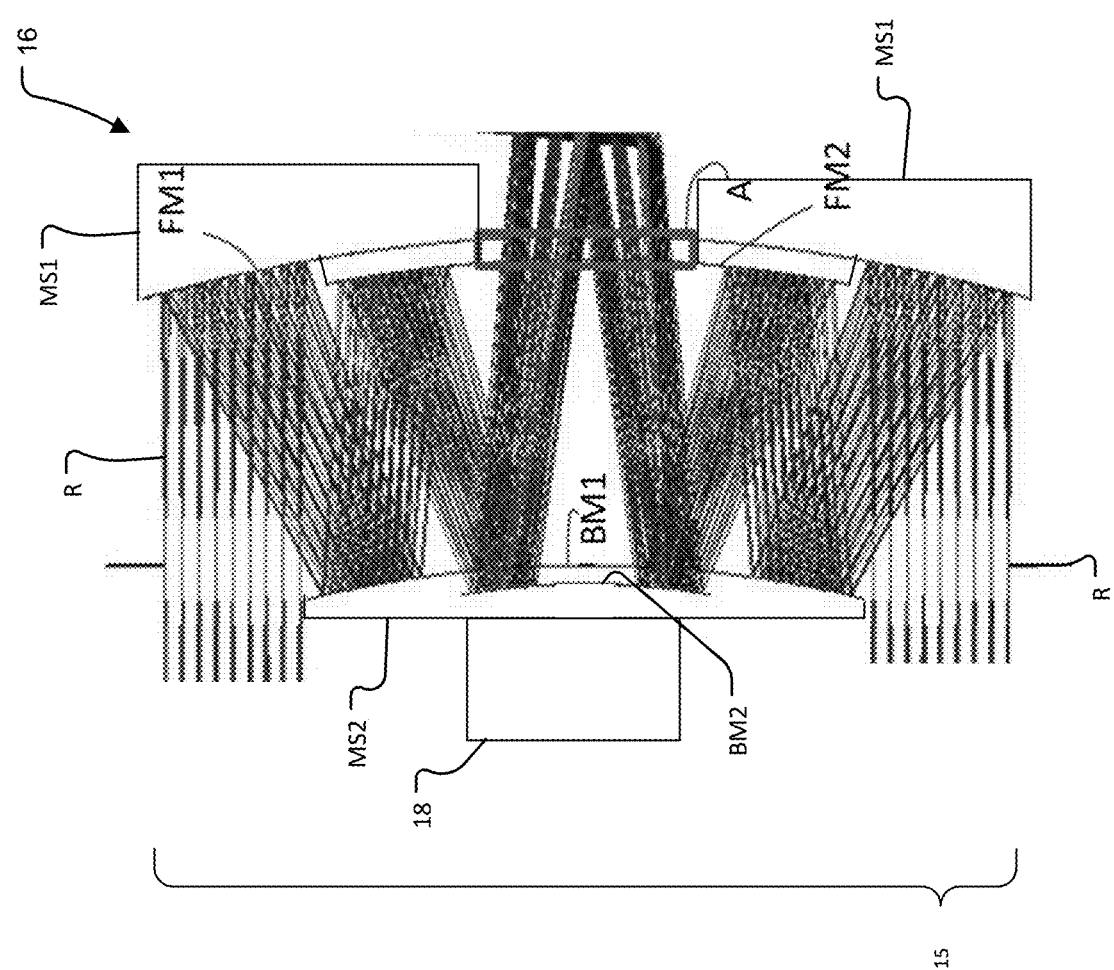
FIG. 2 is a side cross sectional view showing the ray paths for the mirror system.

FIG. 2 shows the mirror system 16. It is designed to collect and focus light R in multiple spectral bands, received through the common aperture 15. Such all-reflecting systems generally are preferred when operating over wide spectral domains. Highly reflecting, wide-band coatings are generally easily fabricated. Folded ray design minimizes the length of the mirror system 16.

The imaging system uses two concave mirrors—primary mirror FM1 and tertiary mirror FM2 formed on a first mirror substrate MS1. It also uses two convex mirrors—secondary mirror BM1 and quaternary BM2 formed on a second mirror substrate MS2. Rays are reflected multiple times in the folded optical system design before exiting through the mirror aperture A in the primary mirror FM1 and the tertiary mirror FM2 and first mirror substrate MS1.

In one embodiment, the phased array send and receive antennas 18 are installed on the backside of the second mirror substrate MS2 in what is termed the center obscuration of the mirror system 16. In this way, the send and receive antennas look out through the same aperture. They are also pointed with the movement of the gimbal 86 and share a boresight of the mirror system 16.

Figure 3:
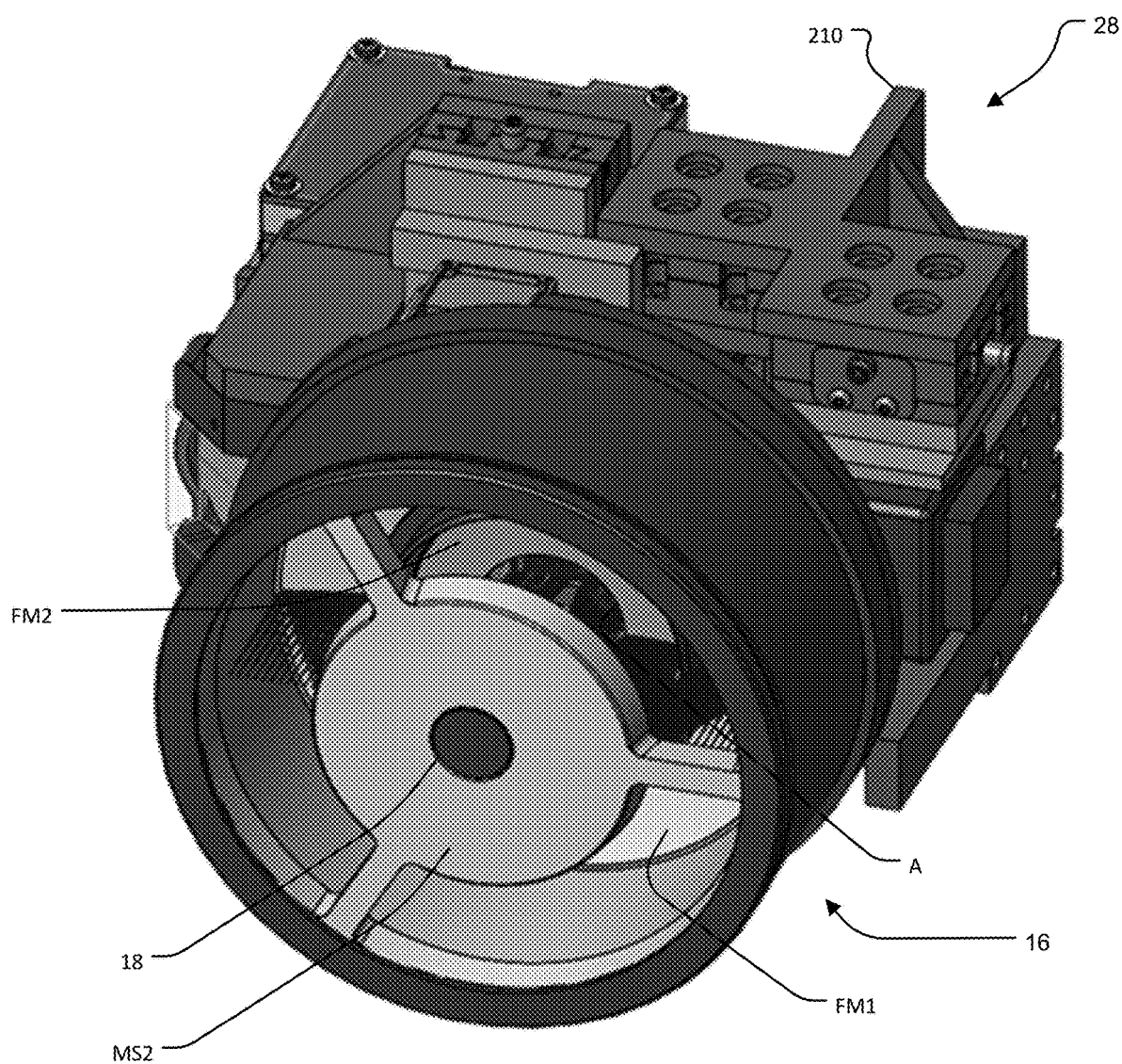
FIG. 3 is a perspective view of the sensor fusion system.

FIG. 3 shows the mirror system 16 and the image sensor system 28.

The image sensor system 28 comprises a rigid three-dimensional optical bench 210 to which the components of the sensor system 28 are mounted. Preferably, the rest of the sensor package 25 is also mounted to this bench 210 along with the image processing computer 45.

Preferably this entire system is mounted on a relatively small gimbal. Thus, in the preferred implementation, the mirror system and the optical bench 210 and the other portions of the sensor package 25 that are mounted to the optical bench 210 are less than 30 centimeters in all three dimensions. Preferably, the entire system fits within a sphere of less than 30 centimeters in diameter.

Figure 4:
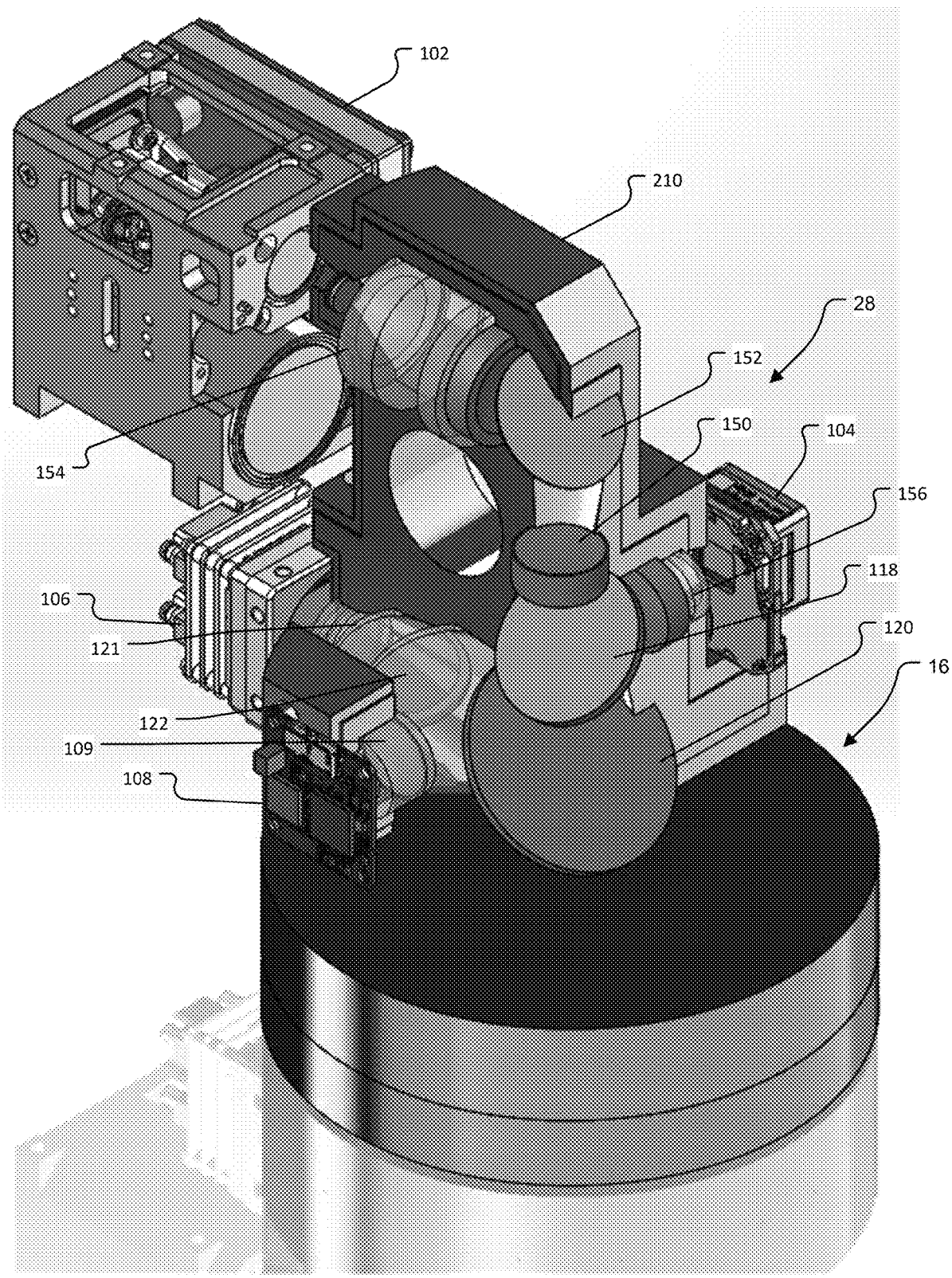
FIG. 4 is a perspective partial cutaway view of the sensor fusion system showing the four channel beam splitting to the image sensors.

FIG. 4 shows the details of the image sensor system 28.

The image sensor system 28 includes a 4 channel beamsplitter system.

In more detail, light from a target is collected by the mirror system 16. The incoming light is transmitted through the aperture A and received by a VIS-SWIR/MWIR-LWIR beamsplitter 120 that is held by the optical bench 210. This divides the incoming light into two spectral bands VIS-SWIR and MWIR-LWIR. Preferably, the VIS-SWIR/MWIR-LWIR beamsplitter 120 comprises a transparent substrate on which a dichroic dielectric coating has been deposited. This coating is reflective to the VIS-SWIR bands but transmits the MWIR-LWIR bands.

The VIS-SWIR, in the illustrated embodiment, is reflected to pass to a VIS/SWIR beamsplitter 122 held by the optical bench 210. The VIS/SWIR beamsplitter 122, similarly comprised of a substrate and dichroic coating, divides the VIS from the SWIR. In the illustrated embodiment, the VIS is reflected to a VIS image sensor module 108 mounted to the optical bench 210. A visible light image is formed on VIS image sensor module 108 by lens 109. In one example, the visible image sensor module has at least 1600×1200 pixel focal plane array and is a CMOS-type sensor.

On the other hand, the SWIR is transmitted through the VIS/SWIR beamsplitter 122 to a SWIR image sensor module 106 mounted to the optical bench 210. Lenses 121 form the image on the module. In one example, the SWIR image sensor 106 has at least a 640×512 InGaAs image plane pixel array.

The MWIR-LWIR light, in the illustrated embodiment, is transmitted by the VIS-SWIR/MWIR-LWIR beamsplitter 120 and passes to an MWIR/LWIR beamsplitter 118. The MWIR/LWIR beamsplitter 118 divides the MWIR from the LWIR. In the illustrated embodiment, the LWIR is reflected to LWIR lenses 156 and imaged onto an LWIR image sensor module 104 mounted to the optical bench 210.

In one example, the LWIR image sensor 104 is a 12 µm pitch vanadium oxide (VOx) uncooled detector, having at least a 640×512 or 320×256 focal plane pixel array.

On the other hand, the MWIR is transmitted to an MWIR image sensor module 102 mounted to the optical bench 210. Specifically, the MWIR light that is transmitted through the MWIR/LWIR beamsplitter 118 is collimated by a first MWIR lens 150 and then reflected by fold mirror 152. Additional MWIR lenses 154 form an image of the MWIR light onto the MWIR image sensor module 102.

In one embodiment, MWIR image sensor 102 is a HgCdTe detector with an integrated dewar cooler assembly. One example has 1280×720, with a 12 µm pitch, focal plane pixel array.

Figure 5:
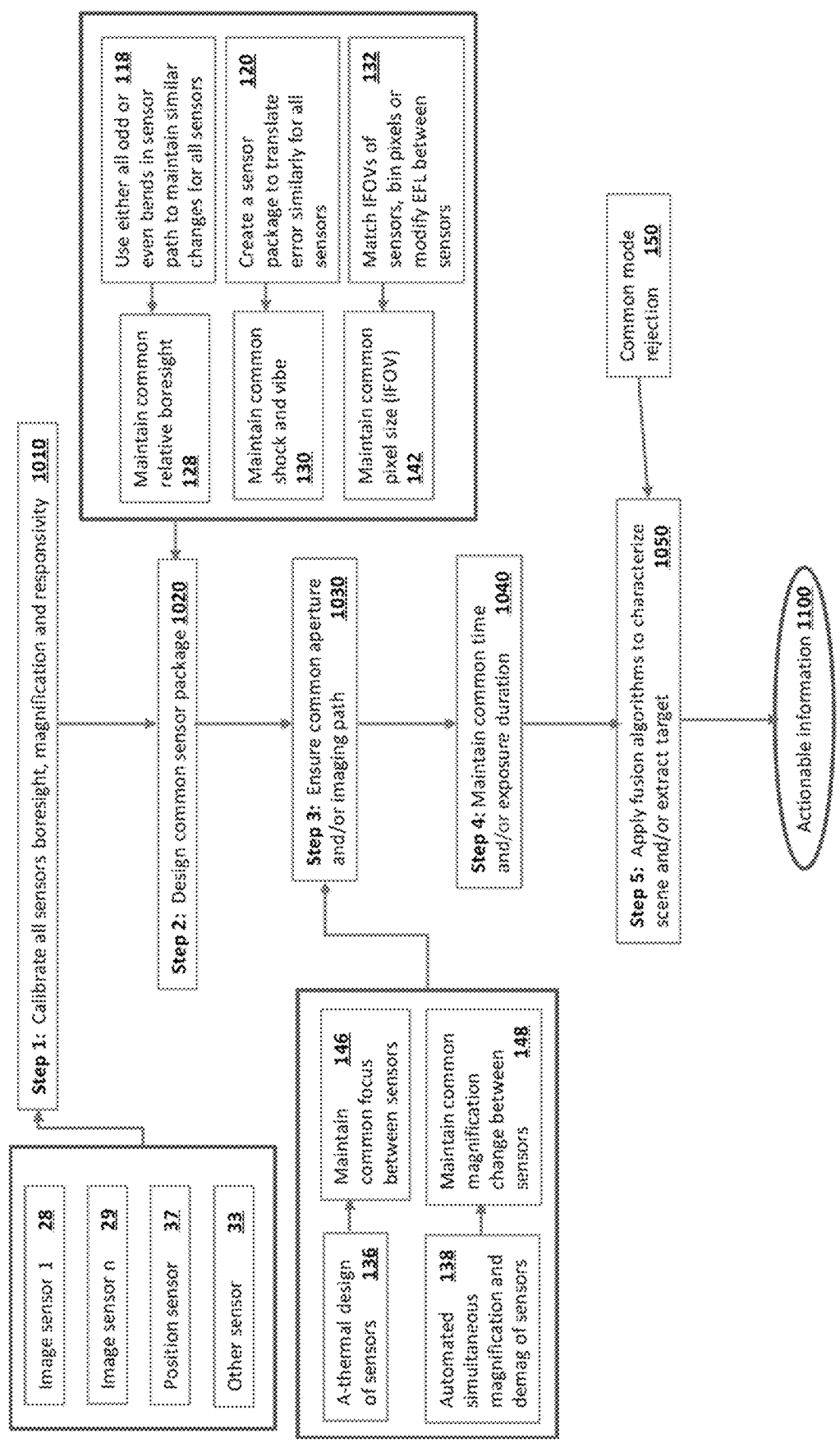
FIG. 5 is a flow diagram showing the operation of the gimbal-mounted system with common boresight, starting from calibration of individual sensors to ending with actionable information.

FIG. 5 outlines the flow diagram of design and operation of the compact system with common boresight, starting from calibration of individual sensors and ending with actionable information.

In Step 1 (1010), the image sensor system 28, accelerometer and attituded sensors 37 and other sensors also listed in sensor package 25, are calibrated for magnification and responsivity, and their boresights are characterized. The boresight calibration here refers to focusing the sensor and determining the FOV (Field-Of-View), IFOVs (pixel size), relating pixels to pixels on other sensors/emitters, and pointing direction (center of image). Responsivity (i.e., instrument sensitivity) is specified by the manufacturer. Magnification and boresight (focus and FOV) are adjustable within manufacturer-specified limits.

While Step 1 (1010) characterizes individual sensors, in Step 2 (1020) the common sensor package 25, indicated in FIG. 1, is created.

The common sensor package is characterized by a common relative boresight 128. One way to do that is to use consistent numbers of bends in the sensor paths to maintain similar changes for all sensors 118 to ensure that the image drifts across the sensors at the same rate. For example, a 2° oscillation of the sensor package will cause the image at a given sensor to drift slower than an image path reflected once at 90° causing the angle to double to 4°.

The sensor package 25 must maintain common shock and vibration characteristics 130. One way to do that is to create a sensor package 120 in which all of the sensors are exposed to the same shock, other acceleration and vibration.

The sensor package 25 must maintain common instantaneous field-of-view (IFOV) 142. This amounts to matching IFOVs of sensors, binning pixels, or modifying focal length between sensors to avoid sensor ambiguity when focusing (box 132). Magnification and boresight (focus and FOV) are adjustable within manufacturer-specified limits. Having common FOVs and IFOVs makes image registration and other data registration tasks much easier than it would be if data were acquired without using common aperture 15 and without common FOV and IFOV (pixel size).

Step 3 (1030) involves ensuring common aperture and/or design path 15, mentioned in FIG. 1.

With regards to common aperture and/or imaging path 15, one must maintain common focus between sensors 146. As described in box 136, this can be achieved by athermalized (temperature-insensitive) optical design, allowing for a common defocus for all sensors, removing the need for multiple stages to keep all sensors in focus.

Also with regards to common aperture 15, it is necessary to maintain common magnification change between sensors 148. This can be achieved, as indicated in box 138, by automated simultaneous magnification and demagnification of all sensors. Otherwise, errors due to mismatched magnification or demagnification will lead to sensors staring at different locations on the scene or target.

In Step 4 (1040), data from multiple sensors are acquired by maintaining common time and/or exposure duration. As indicated in FIG. 1 and implemented in Step 3, all incoming signals in Step 4 pass through the common aperture 15. Maintaining common aperture and imaging path in Step 3 assures spatial match of acquired data. Step 4, on the other hand, assures temporal match of acquired data. Both spatial match and temporal match of data are crucial for real-time sensor fusion applications. To simplify algorithms, it is assumed the image is properly mapped to each detector when fusing images. In order to do this with common mode rejection 150, all the motion errors need to be the same in all sensors fused together. This means one must take measurements around the same time in order to sample the same motion errors.

Time, exposure duration and frame count information is maintained in and made available from time stamp and frame count 40 for i processing module 45 in FIG. 1.

If Steps 2-4 of data acquisition are carried out properly, rejection of optical and mechanical errors will happen automatically by common mode rejection 150. Common mode rejection is the outcome of the combination of Steps 2-4. By following Steps 2-4, platform and system errors are automatically removed by common mode rejection. This happens by optically and mechanically isolating errors and then propagating errors through the sensors with a commonality. This ensures that the sensors are looking at same target regardless of the common error.

In Step 5 (1050), fusion algorithms are used. This amounts to using predetermined algorithms to characterize a scene and/or extract a target.

Prior to this step, the image sensors of the sensor system 28 are essentially registered by virtue of the way they were acquired in the previous Steps 2-4. Image data and other data, such as LIDAR and accelerometer data are spatially and temporally synced.

Feature extraction 48 would be done in Step 5 (1050). Feature identification 50 would also be done in Step 5. Feature extraction could, e.g., be a region in an image that contains potentially static barriers, such as trees and road signs (e.g., traffic signs and lights). Feature extraction could be more precise identification of extracted features, such as differentiation of bicycles from cars, or cars from trucks. It may also include identifying pedestrians during day or night. Bicycles can be distinguished from cars, for example, by examination radar cross-section data from RF information produced by the range finding/RADAR unit 36. Tracking 51, also performed in Step 5, could include distance between cars, for example, using LIDAR 21 data. Also in Step 5, velocity information and weather conditions would be determined. Some scene descriptors, ascertained in Step 5, could include weather conditions.

The output of the processing module 45, computed in Step 5 (1050), is considered actionable information 1100. This information is passed to modules 55 (specific information without reference to sensor type) and 60 (processed images).

Actionable items could also include "proximity maps", such as speed of car 1 and other vehicles, and connection map of car 1 to its surroundings.

Alternatively, "proximity maps" could be created in separate steps using other actionable information, outside of Step 5 (1050).

The main controlling program (not shown) will act on actionable information 1100. One such action, e.g., for a self-driving car, could be to decide whether to change speed or apply brakes. The controlling program could contain a lookup table, expert system, and/or artificial intelligence (AI) software for decision making.

While this invention has been particularly shown and described with references to preferred embodiments thereof, it will be understood by those skilled in the art that various changes in form and details may be made therein without departing from the scope of the invention encompassed by the appended claims.

What is claimed is:

1. A multi-sensor system, comprising:
   a mirror system collecting light received through a shared aperture; and
   a sensor package including an image sensor system receiving the light from the mirror system and dividing the collected light between different image sensors of the sensor package; and
   a gimbal for carrying the mirror system and the sensor package; and
   an image processing system that is mounted with the sensor package and on the gimbal, the image processing system processing information from the sensor package to create fused image data from the image sensors.

2. The system of claim 1, wherein the mirror system and the sensor package fit within a sphere of less than 30 centimeters in diameter.

3. The system of claim 1, further comprising the sensor package emitting radiation out through the shared aperture.

4. The system of claim 1, wherein the sensor package includes a RADAR system and/or a LIDAR system interrogating a scene through the shared aperture.

5. The system of claim 1, further comprising an antenna mounted to a front obscuration of the mirror system.

6. The system of claim 1, wherein the sensor package includes an accelerometer.

7. The system of claim 1, wherein the image processing system performs feature extraction.

8. The system of claim 1, wherein the image processing system performs object tracking.

9. The system of claim 1, further comprising a multiplexer for transmitting fused data, generated by the image processing system, off of its gimbal.

10. The system of claim 1, further comprising a clock for enabling synchronization of information received from the sensor package to create the fused image data.

11. The system of claim 1, wherein the image sensor system comprises a long wave infrared spatially resolved image sensor, a mid wave infrared spatially resolved image sensor, a visible spatially resolved image sensor, and/or a short wave infrared spatially resolved sensor.

12. The system of claim 1, wherein the mirror system comprises at least a primary and a secondary mirror for relaying light received through the common aperture to the sensor package.

13. The system of claim 12, further comprising a phase array antenna system mounted on a front obscuration in front of the secondary mirror of the mirror system.

14. The system of claim 12, wherein the mirror system further comprises a tertiary mirror and a quaternary mirror.

15. The system of claim 1, further comprising an articulated fold mirror or prism, mounted in front of the mirror system.

16. The system of claim 1, further comprising a Risley prism mounted in front of the mirror system.

17. The system of claim 1, wherein the system is used as a multi-band star tracker.

18. The system of claim 1, wherein the sensor package includes a clock.

19. The system of claim 1, wherein the sensor package includes an inertial measurement unit (IMU).

20. The system of claim 1, wherein the sensor package includes or is mounted to an inertial reference unit (IRU).

21. A multi-sensor system, comprising:
a mirror system collecting light received through a shared aperture;
an image sensor system receiving the light from the mirror system and dividing the collected light between different image sensors;
an image processing system that processes information from the image sensors to create fused image data based on a common clock; and
a gimbal carrying the mirror system, image sensor system, and the image processing system.

* * * * *